Jan. 6, 1953           E. A. STALKER           2,624,531
STABILIZING MECHANISM FOR ROTARY WING AIRCRAFT
Filed Oct. 18, 1946                          3 Sheets–Sheet 1
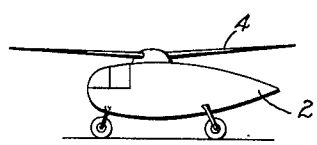
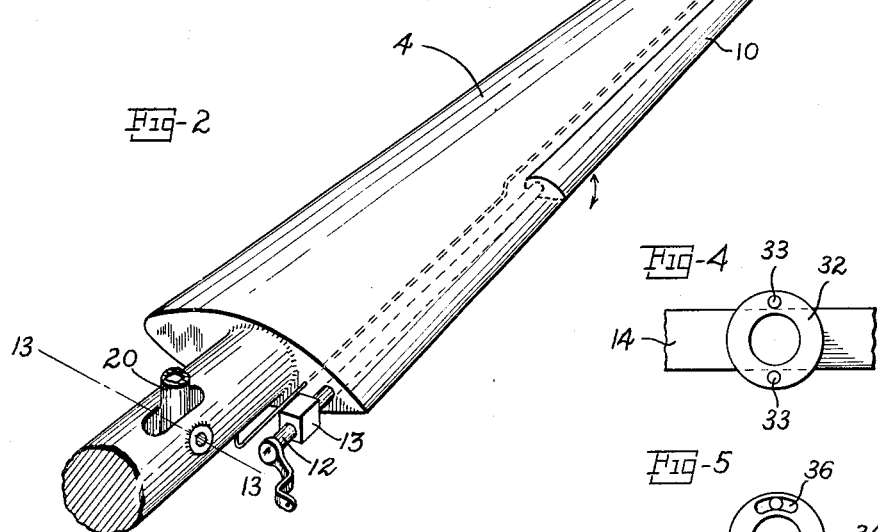
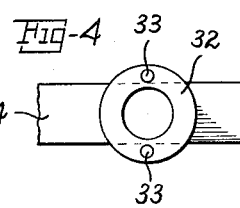
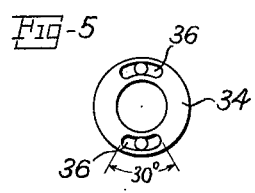
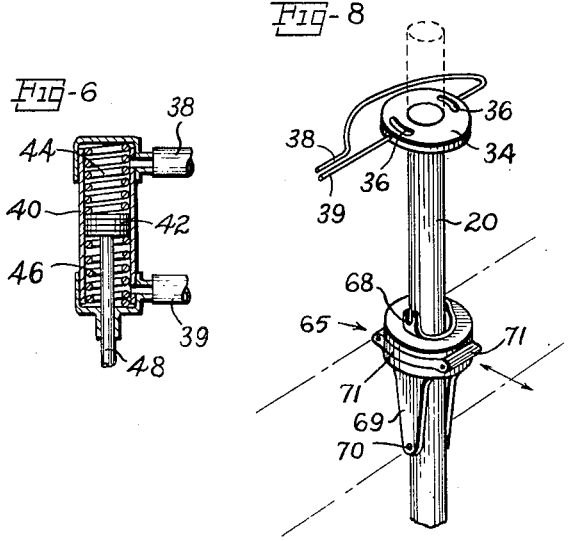
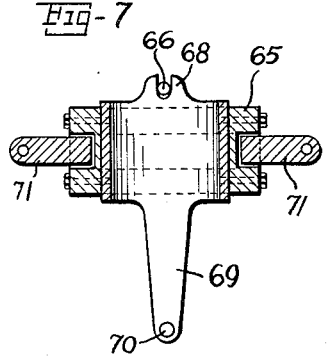
INVENTOR.
Edward A. Stalker
BY
Marechal & Biebel
ATTORNEYS

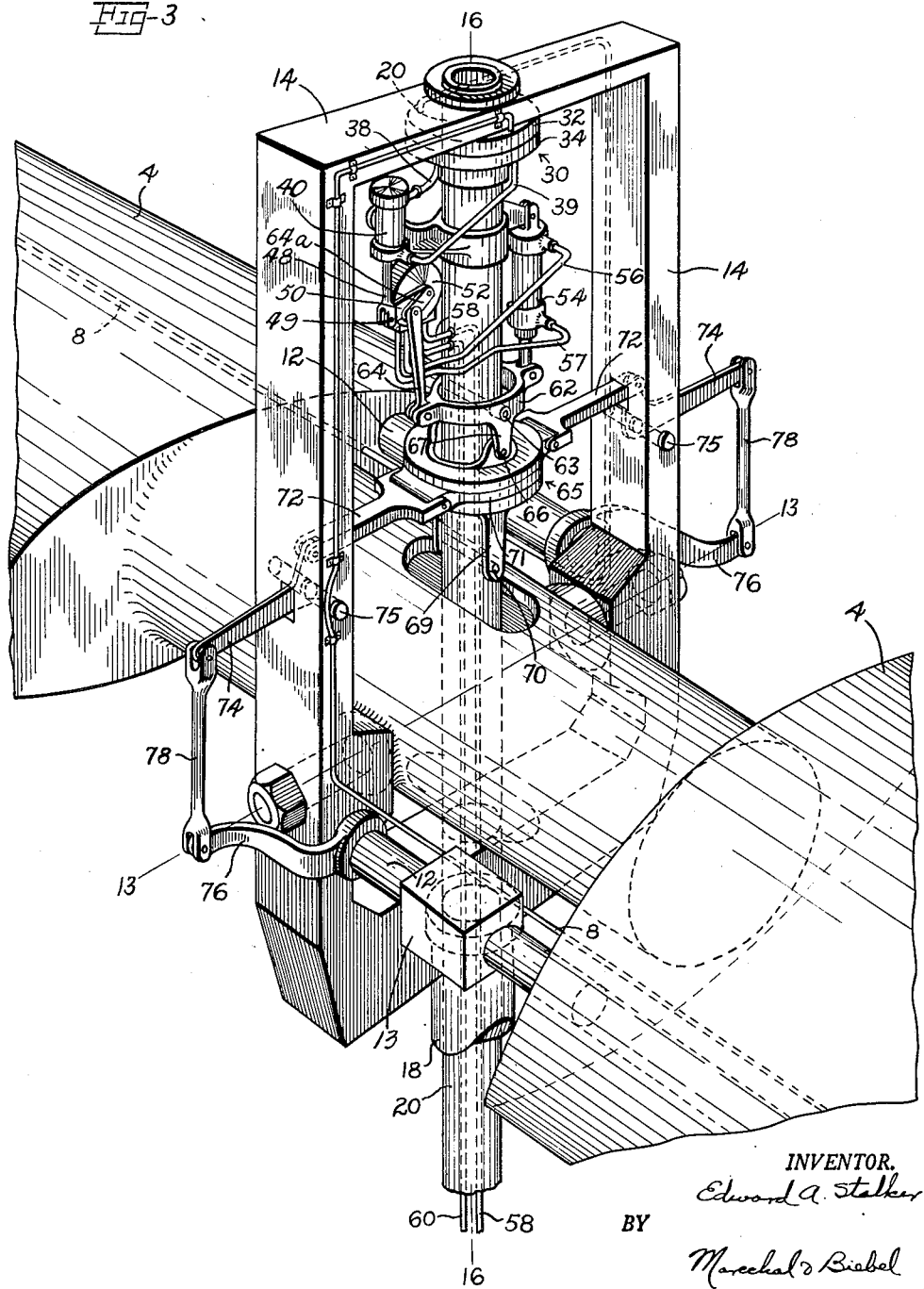

Jan. 6, 1953     E. A. STALKER     2,624,531
STABILIZING MECHANISM FOR ROTARY WING AIRCRAFT
Filed Oct. 18, 1946     3 Sheets-Sheet 3
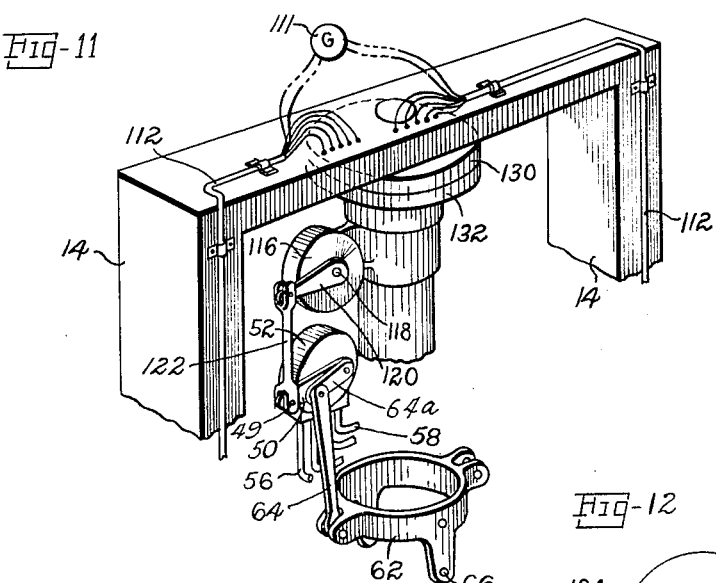
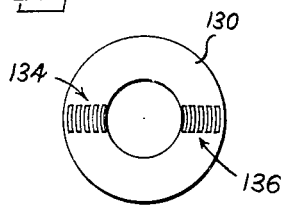
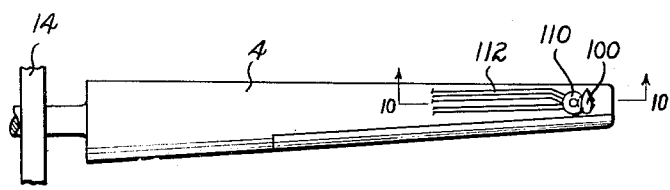
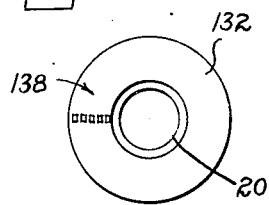
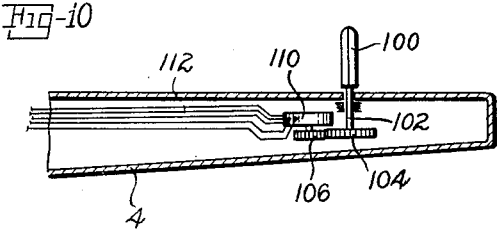
INVENTOR.
Edward A. Stalker
BY
Marechal Biebel
ATTORNEYS Patented Jan. 6, 1953

2,624,531

UNITED STATES PATENT OFFICE 2,624,531

STABILIZING MECHANISM FOR ROTARY WING AIRCRAFT

Edward A. Stalker, Bay City, Mich.

Application October 18, 1946, Serial No. 704,167

3 Claims. (Cl. 244—17.13)

This invention relates to aircraft and particularly to the control of aircraft of the direct lift type.

An object of the invention is to provide means for stabilizing or balancing aircraft of the direct lift type.

Another object is to provide means particularly adapted to stabilize direct lift aircraft.

Another object is to provide means for stabilizing aircraft, said means functioning in response to a property of the relative wind, such as its pressure or direction.

Still another object is to provide means of stabilizing aircraft which means are free from the accumulation of errors from their operation.

Other objects will appear from the description, claims and drawings.

The above objects are accomplished by the means illustrated in the accompanying drawings in which—

Fig. 1 is a side elevation of an aircraft to which the control of the present invention is applicable;

Fig. 2 is a perspective of a helicopter blade or wing in accordance with the invention;

Fig. 3 is a perspective view of a rotor hub and the mechanism associated with the blades to accomplish the objects of this invention;

Fig. 4 is a view from below of the upper plate of the swivel coupling for transferring pressure from the tip Venturi to the stationary air cylinder in the hub;

Fig. 5 is a view from above the lower plate which registers with the upper plate of the swivel coupling shown in Fig. 4;

Fig. 6 is a section through the control cylinder;

Fig. 7 is a vertical axial section through the cam, cam ring, and connecting rod ring;

Fig. 8 is a somewhat diagrammatic drawing showing the relative arrangement of axes and lines of action of the mechanism;

Fig. 9 is a fragmentary top view of a blade and the clevis;

Fig. 10 is a fragmentary section taken along line 10—10 in Fig. 9;

Fig. 11 is a fragmentary view in perspective of the vane-electrical means for governing the blade lift variation;

Fig. 12 is a view from the bottom of one of the electrical contact plates; and

Fig. 13 is a view from above of another of the electrical contact plates.

While this invention is useful in other types of aircraft, it is particularly useful for helicopters and accordingly will be described with reference to such type. A helicopter has no inherent stability in hovering and tends to continue a tilting disturbance. In forward flight some stability may be obtained from tail planes and the like but the machine still remains laterally unstable. This application describes controls which stabilize the aircraft laterally but which are also applicable to stabilize the machine longitudinally if desired.

The primary requirement for a satisfactory lateral control device is that it has as its activator an instrument which is sensitive enough to respond to a relatively slight lateral drift of the helicopter. One such instrument which responds to both the direction and intensity of lateral slippage utilizes the difference in dynamic pressure between the advancing and retreating blades. If $P_0$ is the static pressure, $\rho$ the mass density of the air, $U$ the tip rotational velocity, and $V$ the slip velocity, then the pressure difference $\Delta P$ as measured by two Pitot tubes facing into the relative wind is:

$$\Delta P = \left[P_0 + \frac{\rho}{2}(U+V)^2\right] - \left[P_0 + \frac{\rho}{2}(U-V)^2\right]$$

$$= \frac{\rho}{2}[(U+V)^2 - (U-V)^2]$$

Expanding the squared terms and reducing gives:

$$\Delta P = \frac{\rho}{2}(4UV)$$

This represents a pressure difference greater in value than the dynamic pressure of the relative wind. An idea of the magnitude of the magnification is obtained by a sample computation.

Let
$$V = 5 \text{ F. P. S.}$$
$$U = 400 \text{ F. P. S.}$$

Then $$\Delta P = \frac{\rho}{2}(4 \times 400 \times 5) = \frac{\rho}{2} \times 8000$$

whereas the dynamic pressure $P_s$ due to the side slip velocity would be $$P_s = \frac{\rho}{2} \cdot 5^2 = \frac{\rho}{2} \times 25$$

The ratio of magnification of $M$ is thus $$M = 8000/25 = 320$$

This calculation serves to show how great the magnification is when the Pitot tube openings face into their respective relative winds. A preferred construction makes use of two Venturi tubes (instead of Pitot tubes) placed as described at the outer ends of opposite blades, one of which faces forwardly and the other rearwardly with respect to the directions of side slip of the aircraft. The pressure difference ΔP is obtained between the Venturi throats. By properly proportioning the throat area relative to the inlet area of each venturi the value of M can readily be tripled. It is thus apparent that this arrangement of the Venturis constitutes a highly sensitive means of detecting sideslip.

Referring to the drawings which disclose a preferred embodiment of the invention, in Fig. 1 is shown a helicopter having the fuselage 2 and the two bladed rotor 4, the detailed blade structure being shown in Fig. 2. At the tip of each blade is a venturi 6 from the throat 7 of which a pressure line 8 leads to the hub of the rotor. Each blade contains a flap 10 whose deflection angle is controlled by the torque tube 12.

The mechanism within the rotor hub is shown in Fig. 3. The rotor 4 hinges along the transverse axis 13—13 and is supported by the cage clevis 14 which pivots about the upright axis 16—16. Coinciding with the axis 16—16 and contained within the clevis support bearing 18 is the center post 20 stationary with respect to the fuselage.

At the top of the center post is the swivel coupling 30, the details of which are shown in Figs. 4 and 5. The upper half 32 of the swivel coupling is attached to the cage clevis 14 and rotates with it. This half is provided with two diametrically opposite openings 33 to receive the pressure lines 8 each leading from a tip venturi 6. The mating or lower half 34 of the swivel coupling is attached to the center post 20 and is stationary. The lower half contains two circular slots 36 (Fig. 5) located opposite each other and in such a position radially as to match up periodically with the pressure inlets of the upper plate. In this way only the pressure at a particular point on the orbit of the blade venturis is utilized and made effective.

Leading from the lower swivel plate and communicating with the two slots 36 are a pair of pressure lines 38, 39 which terminate at opposite ends of the air cylinder 40. The air cylinder contains a piston 42 (Fig. 6) which is held in a neutral position by the springs 44 and 46, the pressure lines 38, 39 opening into opposite ends of the cylinder. The piston rod 48 is connected by pin 49 to the arm 50 of the control valve 52 which controls the high pressure oil feeding the hydraulic cylinder 54 via the oil lines 56, 57. High pressure oil is fed to the valve 52 by the line 58 from an oil pump (not shown) and returned to the pump through the line 60, both lines entering the center post 20 and passing down and out at the bottom.

The hydraulic cylinder 54 operates a pivoted actuator ring 62 which is pivoted in post 20 at 63 and connected to the body of control valve 52 by the link 64 and follow-up arm 64a. This completes the control for the valve 52.

The ring 62 is also in contact with the cam 65 by means of two pins 66 carried in downwardly extending arms 67 which ride in a slot cut in the lugs 68 on the cam as shown in Fig. 7. The cam 65 carries depending arms 69 by means of which it is pivoted to the center post at 70. It is thus mounted for swinging movement in a plane generally transverse of the center post about the axis of pins 70 so that when displaced the cam is then eccentrically located in the plane substantially parallel to the direction of flight. The internal diameter of the cam is sufficiently larger than the outside diameter of post 20 to allow a sufficient movement to develop the proper control action on the flaps which are thus cyclically varied in response to displacement of cam 65 to cause selective variation in the lift of the blades when they extend laterally of the direction of flight.

When the hydraulic cylinder 54 changes the relative position of the ring 62, the cam 65 also is displaced. The eccentricity thus imparted to the cam is relayed to the flaps 10 in the blades through the connecting ring 71 riding on the cam and supporting the connecting rods 72. These rods actuate the crank arms 74 which are mounted on pins 75 in clevis frame 14 and connected to the torque arm 76 on the flap torque tube 12 by the link 78 (Fig. 3).

When the ring 62 has tilted the amount determined by the movement of the piston 42 in the air cylinder the arm 64 cuts off the flow of fluid to cylinder 54, thus affording a follow-up action.

When there is zero slippage during flight the air cylinder 44 is at neutral since there is no pressure difference. Also at neutral is the cam 65 and therefore the flaps are in their normal or non-deflected positions.

However, as the helicopter begins to slip sideways the pressure difference effective upon the two venturis in a corresponding orbital position of the blades immediately actuates the hydraulic cylinder which creates an eccentricity in the cam 65 in direct proportion to the intensity of the slip velocity and also in the proper direction. The eccentricity of the cam causes the flaps to be deflected cyclically in such a manner that the slipping of the helicopter is arrested. As the slipping decreases the pressure differences of the two venturis become less and the mechanism begins to return to the neutral position.

In Fig. 8 the orientation of the pertinent features of the device is illustrated. When the helicopter is slipping sideways, the pressure difference will be at a maximum when the rotor blades are approximately parallel to the fuselage center line. Therefore the swivel coupling 34 should be placed with the slot openings 36 approximately in a fore and aft position making due allowance for lag in the action of the device.

Then, in order to compensate for the sideslipping of the helicopter, the flaps 10 should be deflected or raised when the blades are normal to the fuselage center line. This means that the cam 65 should be pivoted about an axis which is also approximately normal to the fuselage center line, again making proper allowance for lag in action. With such arrangement any tendency toward side-slip will be promptly sensed and a correcting force developed at once to restore the aircraft to a normal path of flight or if hovering, to a true hovering condition free of lateral travel. The sensing of the condition of slip takes place when the blades are substantially in line with the fuselage while the correction in blade lift derived therefrom is not made until a substantial peripheral travel of the blade, approximately a quadrant, has taken place, thus both affording sufficient time for the mechanism to function properly and securing the most favorable conditions respectively for both the sensing and lift correcting operations.

In another form of the invention shown in Figs. 9–11, the direction of the relative wind is used to actuate the mechanism for controlling the lifts of the blades. Vanes 100 extend into the relative wind substantially normal to the blades 4 and are pivoted preferably near the tips of the blade and are suitably weighted internally to be free from mass acceleration forces, the pivot of the vane being sufficiently close to the leading edge to normally maintain the vane in a neutral position. Although the vanes are preferably mounted on the blade tips, they may also be mounted upon some other element rotating in coordination with the blades. When the blades extend laterally the vanes should be substantially parallel to the chord direction of the blade or at least they should have a definite relation to this line.

If the aircraft is side slipping the vanes will be turned from their neutral or basic position. The vane is fixed to shaft 102 which has fixed to it the gear 104 which meshes with the smaller gear 106 fixed to the shaft of the self-synchronous master motor 110 supplied with power from power source 111 shown as a single phase source of power and suitably connected to each of cables 112. As shown, gear 104 is preferably larger than gear 106 so that movement of the latter and thus of motor 110 will be suitably magnified, to provide greater accuracy of control. This motor 110 is electrically connected through the cable 112 with the follower motor 116 (Fig. 11). Its shaft 118 is connected by arm 120 and link 122 to the arm 50 of valve 52. Since the remainder of the valve and cam structure is similar to that described above, it is not repeated in Fig. 11.

The electric current is conducted from the moving blades to the follower motor 116 by means of the circular plates 130 and 132, the former fixed to and rotatable with the clevis 14 and the latter secured to the post 20. The plate 130 has two sets 134 and 136 of contactors of five each, one set for each vane connected through cables 112 respectively with the vanes. However, current only flows from the source 111 through one set at a time. This is assured by providing only one set of contactors 138 in the plate 132. Hence, as the blades and the contactors on plate 130 rotate, first one set 134 and then the other 136 registers with the set of contactors 138 on plate 132. By this arrangement only one blade, when it is in the retreating position, for instance, transmits a control potential to the follower motor 116 in accordance with the direction of the relative wind as determined by the vane 100. This control potential is translated into variation of the blade lift so as to eliminate the sideslip causing the deviation of the relative wind in the manner described earlier. The control sensitive to side slip could be derived from the advancing blade but the retreating blade will have a greater rotation of its vane for a given sideslip velocity because its chordwise relative wind velocity is less and for that reason is preferred for the purposes of this invention.

It will now be clear that a novel and useful means of stabilizing helicopters has been disclosed, making it unnecessary for the pilot to be continuously on the alert to correct any tendency of the helicopter to roll over as has been the case heretofore, and providing a reliable and successful means of correcting the well-known inherent tendency for helicopters to tilt and roll over. While gyroscopes have been employed to govern the control of helicopters so as to stabilize them with respect to the plane of rotation of the gyroscope, the gyroscope tends to drift from its original plane due to friction of its mounting and to various other disturbing factors. In flight conditions where inclement weather obscures the horizon, the pilot has no way to know whether the gyroscope is still in proper relation to the horizon, yet it is most important at this time for him to be capable of establishing accurately the attitude of the aircraft.

The present invention depends only on a tendency to sideslip which must always occur under the action of gravity if the aircraft is tilted. The presence of a sideslip will bring about correcting changes in the lifting rotor as described to eliminate the sideslip. Thus if the aircraft slips laterally with respect to the longitudinal axis of the fuselage, the venturis at the tips of the blade will detect the sideslip and change the lift of the laterally extending blades so as to right the aircraft and stabilize it in the upright position.

Since the correcting action depends on a sideslip under the action of gravity which has a constant direction of action, the aircraft always has a safe and reliable reference for detecting any tilting of the machine.

Furthermore, the invention provides a means of greatly magnifying the air pressure differences which arises from the velocity of slip. This magnification comes from the difference in pressure at two openings, one facing in the direction of slip and the other facing in the opposite direction. If the openings are subject only to the impact of the relative wind at the blade tips the magnification is quite large, as described being of the order of up to 320. However, if the relative wind is magnified by letting it blow through a venturi so that the ends of the tube are subject to the suction which is increased by the increased velocity at the throats of the venturis, the magnification will be even greater, of the order of 1000 times. For example, if the venturi increases the throat velocity to 1.8 times, the magnification will be 1036 times. As will be readily appreciated, this is highly significant in operating the stabilizing devices and represents a great advance in devices for sensing small movements of the aircraft, such as tilting.

There is also disclosed a means of using the direction of the relative wind with respect to the blade, preferably with respect to the blade when in the laterally extending position. In this orbital position of the blade, a vane pivotally carried on the blade should be parallel to the chord line of the blade if the machine is not sideslipping or tilting. Deviation of the vane from the chordline, which can be regarded as a base or reference line, indicates sideslipping, and the deviation is employed to institute lift changes on the rotor blades to bring about the stabilization of the helicopter.

It will be recognized that the devices described are independent of visibility of the horizon and yet they do not require checking with the horizon since the action of these devices depends on the line of action of gravity which is invariant. This invention therefore represents a substantial advance in safety and ease of operation of direct lift aircraft.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In combination in a direct lift aircraft, an aircraft body, a rotor hub mounted on said body and rotatable about a generally vertical axis, a pair of opposed blades mounted on said hub, means for varying the lift of each of said blades, a detector element mounted on each of said blades, said element being spaced from said axis and responsive to relative wind velocity chordwise of the respective blades, mechanism interconnecting said lift varying means and said detector elements for actuating said lift varying means in response to instantaneous differences of relative wind velocity at said elements, said mechanism including a switching device actuated by rotation of said hub and arranged to render said detector elements effective when either of said blades occupies a predetermined orbital position with respect to said body and to render said elements ineffective for all other orbital blade positions.

2. In combination in a direct lift aircraft, an aircraft body, a rotor hub mounted on said body and rotatable about a generally vertical axis, a pair of opposed blades mounted on said hub, means for varying the lift of each of said blades, a detector element mounted on each of said blades spaced from said axis and in position to be responsive to relative wind velocity chordwise of the respective blades, mechanism interconnecting said lift varying means and said detector elements for actuating said lift varying means in response to instantaneous differences of relative wind velocity at said detector elements, said mechanism including a control device actuated in accordance with rotation of said hub and arranged to render said detector elements effective when either of said blades occupies a predetermined limited range of orbital positions with respect to said body and to render said elements ineffective for all other orbital blade positions.

3. In combination in a direct lift aircraft, an elongated aircraft body, a rotor hub mounted on said body and rotatable about an axis generally perpendicular to the longitudinal axis of said body, a pair of opposed blades mounted on said hub, means for varying the lift of each of said blades, a detector element mounted on each of said blades spaced from said axis and in position to be responsive to relative wind velocity chordwise of the respective blades, mechanism interconnecting said lift varying means and said detector elements for actuating said lift varying means in response to instantaneous differences of relative wind velocity at said detector elements, said mechanism including a control device actuated in accordance with rotation of said hub and arranged to render said detector means effective when said blades occupy substantially the longitudinal position with respect to said body and to render said elements ineffective for all other orbital blade positions.

EDWARD A. STALKER.

REFERENCES CITED

The following references are of record in the file of this patent:

UNITED STATES PATENTS

| Number | Name | Date |
| --- | --- | --- |
| 1,982,968 | Stalker | Dec. 4, 1934 |
| 1,982,969 | Stalker | Dec. 4, 1934 |
| 2,041,796 | Stalker | July 2, 1935 |
| 2,394,513 | De Chappedelaine | Feb. 5, 1946 |
| 2,425,651 | Stalker | Aug. 12, 1947 |